US012743941B2

(12) United States Patent
Chou et al.

(10) Patent No.: US 12,743,941 B2
(45) Date of Patent: Sep. 22, 2026

(54) METHOD, SYSTEM AND COMPUTER READABLE STORAGE MEDIUM FOR GENERATING AN ALERT FOR POTENTIAL STRUCTURAL DAMAGE FROM AN EARTHQUAKE

(71) Applicant: National Applied Research Laboratories, Taipei City (TW)

(72) Inventors: Chung-Che Chou, Taipei City (TW); Shu-Hsien Chao, Taipei City (TW); Che-Min Lin, Taipei City (TW); Chiao-Chu Hsu, Taipei City (TW); Yu-Tzu Huang, Taipei City (TW)

(73) Assignee: NATIONAL APPLIED RESEARCH LABORATORIES, Taipei City (TW)

(*) Notice: Subject to any disclaimer, the term of this patent is extended or adjusted under 35 U.S.C. 154(b) by 0 days.

(21) Appl. No.: 18/958,804

(22) Filed: Nov. 25, 2024

(65) Prior Publication Data

US 2026/0011233 A1 Jan. 8, 2026

(30) Foreign Application Priority Data

Jul. 5, 2024 (TW) ................................ 113125310

(51) Int. Cl.

*G08B 21/00* (2006.01)
*G01V 1/30* (2006.01)
*G08B 21/10* (2006.01)
*H04W 4/90* (2018.01)

(52) U.S. Cl.

CPC ............ *G08B 21/10* (2013.01); *G01V 1/303* (2013.01); *H04W 4/90* (2018.02)

(58) Field of Classification Search

CPC .......... G08B 21/10; G01V 1/303; G01V 1/01; G01V 1/003; G01V 2210/1232; G01V 2210/6161; G01V 2210/614; G01V 1/288; H04W 4/90
USPC ............ 340/540, 691.1, 691.6, 693.5, 686.1
See application file for complete search history.

(56) References Cited

U.S. PATENT DOCUMENTS

| | | | | |
|---|---|---|---|---|
| 10,915,829 | B1 * | 2/2021 | Wani | G06N 20/00 |
| 11,204,435 | B1 * | 12/2021 | Thompson | G01V 1/01 |
| 2014/0188394 | A1 * | 7/2014 | Febonio | G06F 30/13 702/15 |

(Continued)

*Primary Examiner* — Anh V La
(74) *Attorney, Agent, or Firm* — Panitch Schwarze Belisario & Nadel LLP

(57) ABSTRACT

A method for generating an alert for potential structural damage from an earthquake includes: in response to receipt of a first-arrival seismic wave dataset related to a first-arrival seismic wave of the earthquake, calculating an estimated seismic wave parameter set that includes a spectral acceleration; calculating, based on the estimated seismic wave parameter set and a basic structural parameter set associated with a target structure, a ductility value, the basic structural parameter set including a geographical location of the target structure, a structural ultimate base shear coefficient, and an initially hypothetical structural fundamental oscillation period; and in a case where the ductility value is larger than a predetermined threshold, transmitting an alert control signal to control an external alert device to output an alert for potential structural damage of the target structure based on the alert control signal.

11 Claims, 3 Drawing Sheets

(56) References Cited

U.S. PATENT DOCUMENTS

2020/0003918 A1* 1/2020 Vancho .................... G01V 1/01
2023/0055822 A1* 2/2023 Amir ....................... H04L 67/12

* cited by examiner

METHOD, SYSTEM AND COMPUTER READABLE STORAGE MEDIUM FOR GENERATING AN ALERT FOR POTENTIAL STRUCTURAL DAMAGE FROM AN EARTHQUAKE

CROSS-REFERENCE TO RELATED APPLICATION

This application claims priority to Taiwanese Invention patent application Ser. No. 11/312,5310, filed on Jul. 5, 2024, the entire disclosure of which is incorporated by reference herein.

FIELD

The disclosure relates to a method, a system, and a computer readable storage medium for generating an alert, and more particularly to a method, a system, and a computer readable storage medium for generating an alert for potential structural damage from an earthquake.

BACKGROUND

Conventionally, the earthquake early warning system (EEWS) is designed to detect seismic waves, and determine whether a substantial earthquake is happening. In the case that the detected seismic waves indicate a substantial earthquake, the EEWS is configured to generate and output an alert. It is noted that in some cases, the alerts received by all recipients are the same, and the same earthquake may result in different potential damage to different structures.

SUMMARY

Therefore, one object of the disclosure is to provide a method that can alleviate at least one of the drawbacks of the prior art.

According to one embodiment of the disclosure, the method for generating an alert for potential structural damage from an earthquake is implemented using a system that is connected to a seismograph, and an external alert device that is disposed at a target structure. The method includes:

a) in response to receipt of a first-arrival seismic wave dataset, which is related to a first-arrival seismic wave of the earthquake, from the seismograph, implementing a signal processing procedure to process the first-arrival seismic wave dataset, and to calculate an estimated seismic wave parameter set that includes a spectral acceleration;

b) calculating, based on the estimated seismic wave parameter set and a basic structural parameter set that is associated with the target structure, a ductility value, the basic structural parameter set including a geographical location of the target structure, a structural ultimate base shear coefficient, and an initially hypothetical structural fundamental oscillation period; and c) in a case where the ductility value is larger than a predetermined threshold, generating and transmitting an alert control signal to the external alert device, so as to control the external alert device to output an alert for potential structural damage of the target structure based on the alert control signal.

Another object of the disclosure is to provide a system that is configured to implement the above-mentioned method.

According to one embodiment of the disclosure, the system is for generating an alert for potential structural damage from an earthquake. The system is connected to a seismograph, and an external alert device that is disposed at a target structure. The system includes:

- a communication unit that communicates with the external alert device and that receives a first-arrival seismic wave dataset, which is related to a first-arrival seismic wave of the earthquake, from the seismograph;
- a data storage unit that stores a basic structural parameter set that is associated with the target structure, the basic structural parameter set including a geographical location of the target structure, a structural ultimate base shear coefficient, and an initially hypothetical structural fundamental oscillation period; and
- a processing unit that is connected to the communication unit and the data storage unit, and that is programmed to
  - implement a signal processing procedure to process the first-arrival seismic wave dataset,
  - calculate an estimated seismic wave parameter set including a spectral acceleration,
  - calculate, based on the estimated seismic wave parameter set and the basic structural parameter set, a ductility value, and in a case where the ductility value is larger than a predetermined threshold, generate and transmit an alert control signal to the external alert device, so as to control the external alert device to output an alert for potential structural damage of the target structure based on the alert control signal.

Another object of the disclosure is to provide a non-transitory computer storage medium storing computer instructions that, when executed by a processing unit of a computer device, cause the processing unit to execute the steps of the above-mentioned method.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

Throughout the disclosure, the term “coupled to” or “connected to” may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

DETAILED DESCRIPTION

Figure 1:
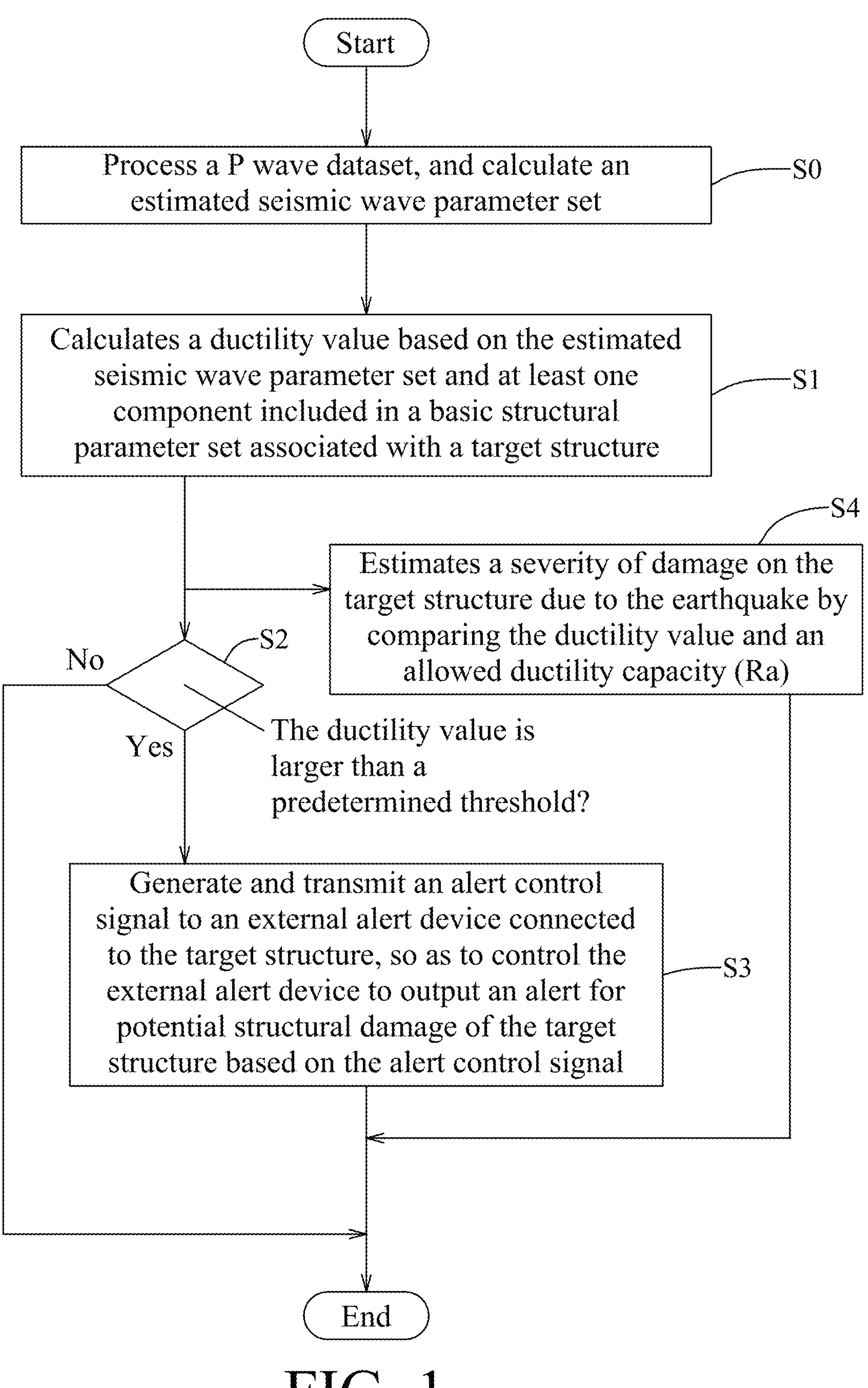
FIG. 1 is a flow chart illustrating steps of a method for generating an alert for potential structural damage from an earthquake according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct t connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 2:
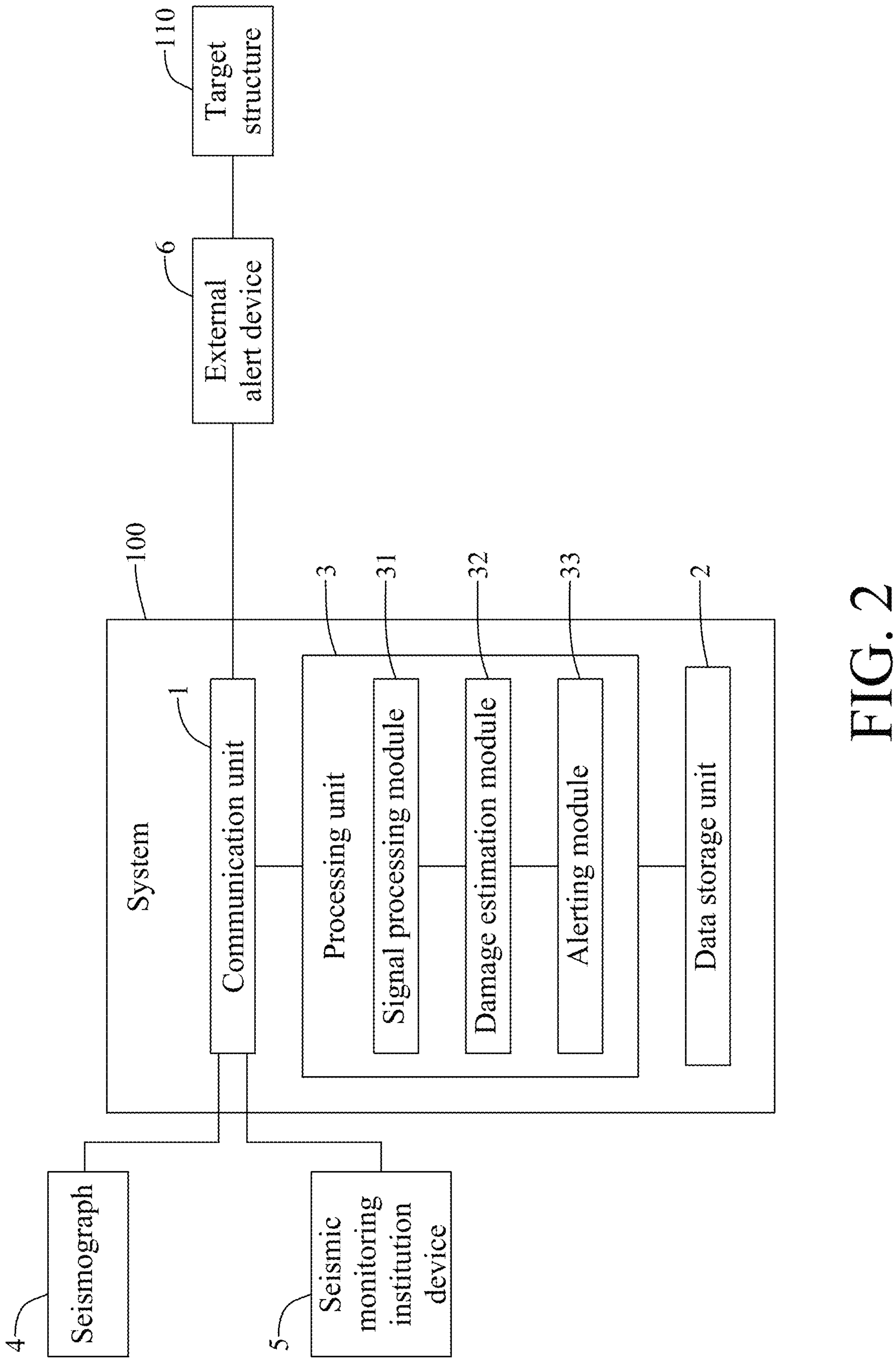
FIG. 2 is a block diagram illustrating an exemplary system for implementing the method of FIG. 1 according to one embodiment of the disclosure.

FIG. 1 is a flow chart illustrating steps of a method for generating an alert for potential structural damage from an earthquake according to one embodiment of the disclosure. In embodiments, the method of FIG. 1 may be implemented using a system. FIG. 2 is a block diagram illustrating an exemplary system 100 for implementing the method of FIG. 1 according to one embodiment of the disclosure.

The system 100 may be embodied using a server, a computer device, a tablet, a laptop, or other suitable equipment, and includes a communication unit 1, a data storage unit 2, and a processing unit 3.

The processing unit 3 may be embodied using one or more of a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc. In the embodiment of FIG. 2, the processing unit 3 includes a number of functional blocks including a signal processing module 31, a damage estimation module 32, and an alerting module 33. Each of the functional blocks may be embodied using microprocessors, software applications, firmware, etc., for implementing the functions as described below.

The data storage unit 2 is connected to the processing unit 3, and may be embodied using, for example, random access memory (RAM), read only memory (ROM), programmable ROM (PROM), firmware, flash memory, or other non-transitory computer readable storage medium. In some embodiments, the data storage unit 2 stores a software application therein, the software application including instructions that, when executed by the processing unit 3, causes the processing unit 3 to execute the operations as described below.

The communication unit 1 is connected to the processing unit 3, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or the fifth generation (5G) of wireless mobile telecommunications technology, or the like.

In use, the communication unit 1 enables communication between the system 100 and a seismograph 4, a seismic monitoring institution device 5, and an external alert device 6. The seismograph 4 may be embodied using commercially available instruments, is placed in an external location and is configured to measure ground displacements to record various data associated with an earthquake, such as a seismogram. The seismic monitoring institution device 5 may be associated with a seismic monitoring institution in charge of monitoring the phenomena related to earthquakes (e.g., the Central Weather Administration of Taiwan or other agencies), and may provide various data measured by the agency about the earthquakes. The external alert device 6 may be disposed at a target structure 110 (which may be a building), and is configured to output a variety of alerts, such as flashing lights, buzzing sounds, audio warnings, texts, etc.

In use, in the occurrence of an earthquake, the system 100 is configured to receive information about different kinds of seismic waves from the seismograph 4, and particularly a primary wave (P wave) dataset and a secondary wave (S wave) dataset. The P wave dataset and the S wave dataset are related to a P wave and an S wave of an earthquake, respectively, which are two kinds of waves that are also known as body waves. Generally, the P wave travels faster than other seismic waves, and is typically a first-arrival seismic wave detected by the seismograph 4. The S wave travels slower than the P wave, and therefore is typically a second-arrival seismic wave detected by the seismograph 4, but generally has a larger amplitude and a larger power than those of the P wave. The S wave is a transverse wave, and the propagation of the S wave applies a horizontal sheer stress on the buildings, and therefore the S wave may be a primary source of damage done to the buildings. It is noted that the recording of the information about different kinds of seismic waves into the P wave dataset and the S wave dataset by the seismograph 4 is readily known in the related art, and details thereof are omitted herein for the sake of brevity.

Additionally, the system 100 is configured to receive information about a hypocenter of the earthquake that is measured by the seismic monitoring institution device 5, and the information includes a plurality of hypocenter parameters such as seismic magnitude scales (M), a focal depth of the earthquake (D), a set of latitude and longitude indicating the geographic position of the hypocenter (te).

As such, it may be beneficial to use the P wave that is first received by the seismograph 4 to estimate a severity of the incoming S wave, and to generate an alert for a building that may be subject to damage from the S wave. In this manner, the people and/or machinery inside the building may be able to take precautions for the incoming S wave, reducing the potential damage.

It is noted that in the embodiment of FIG. 2, only one seismograph 4 and one external alert device 6 are present, but in other embodiments, the system 100 may be in communication simultaneously with additional seismograph(s) 4 disposed in different locations and external alert device(s) 6 associated with different buildings. Furthermore, in the case that the system 100 is capable of obtaining the plurality of hypocenter parameters about the earthquake (e.g., measuring the plurality of hypocenter parameters by the system 100 itself), the connection to the seismic monitoring institution device 5 may be unnecessary.

The data storage unit 2 further stores information associated with the target structure 110, including a basic structural parameter set. The basic structural parameter set includes a geographical location of the target structure 110, an allowed ductility capacity (Ra), a number of stories of the target structure 110 (N), a weight ratio of a ceiling for an $i^{th}$ one of the stories (W$i$/W), a structural ultimate base shear coefficient $$\left(\frac{v_u}{w}\right), 1$$

a hypothetical maximum structural interstory drift ratio yield value $$IDR^{max}_{yield},$$

a hypothetical residual structural interstory drift ratio yield value $$IDR^{res}_{yield},$$

and an initially hypothetical structural fundamental oscillation period $T_{1,i}$.

It is noted that some the above information (e.g., the basic structural parameter set associated with the target structure 110) can be pre-determined and stored in the data storage unit 2.

In use, the method of FIG. 1 is initiated when the seismograph 4 receives a P wave and transmits the P wave dataset related to the P wave to the system 100 via the communication unit 1. Then, in step S0, the signal processing module 31 of the processing unit 3 is configured to implement a signal processing procedure to process the P wave dataset, and to calculate an estimated seismic wave parameter set. In this embodiment, the estimated seismic wave parameter set includes a spectral acceleration $S_a(T_{1,i})$ and an instantaneous power $IP(T_{1,i})$.

It is noted that the method is initiated when the system 100 receives the P wave dataset from the seismograph 4, and in the case that the seismograph 4 does not receive the P wave dataset, the method will not be commenced. Alternatively, in other embodiments, the seismograph 4 may include components similar to the signal processing module 31 for implementing the signal processing procedure to process the P wave dataset to obtain the estimated seismic wave parameter set which can then be transmitted to the system 100. In such cases, the signal processing module 31 may be omitted from the system 100.

Then, in step S1, the damage estimation module 32 of the processing unit 3 calculates a ductility value μ based on the estimated seismic wave parameter set and at least one component included in the basic structural parameter set.

In embodiments, the calculation of the ductility value u includes first calculating a plurality of ductility components, and calculating the ductility value μ using the plurality of ductility components. Specifically, in the embodiment of FIG. 1, the damage estimation module 32 calculates six ductility components (labeled as, a first ductility component $\mu_1$, a second ductility component $\mu_2$, a third ductility component $\mu_3$, a fourth ductility component $\mu_4$, a fifth ductility component $\mu_5$, and a sixth ductility component $\mu_6$, respectively). Then, the damage estimation module 32 calculates the ductility value μ by either selecting one of the ductility components as the ductility value μ, or calculating a weighted average of the six ductility components.

For example, the damage estimation module 32 may select a largest one of the six ductility components as the ductility value μ. The calculation reflects a more conservative estimation for the incoming S wave and may be represented using the following equation:

$$\mu = \max\{\mu_1, \mu_2, \mu_3, \mu_4, \mu_5, \mu_6\}.$$

Alternatively, the calculation of the weighted average of the six ductility components includes assigning a weight to each of the six ductility components (labeled as $w_1$, $w_2$, $w_3$, $w_4$, $w_5$, and $w_6$, respectively). The assignment of the weights may be done based on different situations, and a sum of the six weights equals 1. The calculation of the weighted average reflects a more general estimation for the incoming S wave. In one example, each of the weights $w_1$, $w_2$, $w_3$, and $w_6$ is 0.1, the weight $w_4$ is 0.4, and the weight $w_5$ is 0.2. Then, using the above weights, the calculation of the ductility value μ may be represented using the following equation:

$$\mu = w_1\mu_1 + w_2\mu_2 + w_3\mu_3 + w_4\mu_4 + w_5\mu_5 + w_6\mu_6.$$

It is noted that each of the six ductility components is calculated independently of one another, and is associated with an estimation of a respective one of a magnitude of force from the earthquake applied to the structure (which may be the target structure 110 in this case), a magnitude of energy from the seismic waves applied to the structure, a magnitude of energy outputted by the structure, a maximum deformation of the structure, a residual deformation of the structure, and a change of stiffness of the structure.

The first ductility component $\mu_1$ is calculated using the spectral acceleration $S_a(T_{1,i})$ from the estimated seismic wave parameter set, and the structural ultimate base shear coefficient $$\left(\frac{v_u}{w}\right)$$

and the initially hypothetical structural fundamental oscillation period $T_{1,i}$ from the basic structural parameter set, using the following equations:

$$\mu_1 = f\left(T_{1,i}, S_a(T_{1,i}), \frac{v_u}{w}, T_{1,i}\right);$$

$$\ln\mu_1 = c_0 + c_1 \ln\left(\frac{S_a(T_{1,i})}{g\frac{v_u}{w}}\right),$$

where g represents the gravitational constant, and $c_0$ and $c_1$ represent predetermined coefficients.

The second ductility component $\mu_2$ is calculated using the spectral acceleration $S_a(T_{1,i})$ and the instantaneous power $IP(T_{1,i})$ from the estimated seismic wave parameter set, and the structural ultimate base shear coefficient $$\left(\frac{v_u}{w}\right)$$

and the initially hypothetical structural fundamental oscillation period $T_{1,i}$ from the basic structural parameter set, using the following equations:

$$\mu_2 = f\left(S_a(T_{1,i}), IP^{max}(T_{1,i}), \frac{v_u}{w}, T_{1,i}\right);$$

$$\ln\mu_2 = c_0 + c_1 \ln\left(\frac{S_a(T_{1,i})}{g\frac{v_u}{w}}\right) + c_2 \ln\left(\frac{4\pi^2 IP^{max}(T_{1,i})}{\left(g\frac{v_u}{w}\right)^2 T_{1,i}^2}\right),$$

where g represents the gravitational constant, $c_0$, $c_1$ and $c_2$ represent predetermined coefficients, and $IP^{max}(T_{1,i})$ represents a maximum instantaneous power associated with the P wave. The maximum instantaneous power may be calculated using the following equations:

$$IP^{max}(T_{1,i}) = \max\{IP(t, T_{1,i})\}|_t;$$

$$IP(t, T_{1,i}) = \frac{1}{0.5T_1}\int_{t-0.5T_{1,i}}^{t} v_{filter}(t, T_{1,i})^2 dt,$$

where $v_{filter}(t, T_{1,i})^2$ represents a velocity of the P wave, which is applied through a bandpass filter, over time, and the bandpass filter has a frequency band associated with $T_{1,i}$. Specifically, the frequency band may be within a range from $1/(3T_{1,i})$ Hz to $1/(0.2T_{1,i})$ Hz.

For calculation of the remaining ductility components, a structural response parameter set that may be obtained in response to detection of an earthquake is employed. The structural response parameter set includes a maximum structural interstory drift ratio $IDR^{max}$, a residual structural interstory drift ratio $IDR^{res}$, and a hypothetical structural fundamental oscillation period $T_1$. In some embodiments, the structural response parameter set may further include a structural reaction power $P^{max}$.

The third ductility component $\mu_3$ is calculated using the spectral acceleration $S_a(T_{1,i})$ from the estimated seismic wave parameter set, the structural ultimate base shear coefficient $$\left(\frac{v_u}{w}\right)$$

and the initially hypothetical structural fundamental oscillation period $T_{1,i}$ from the basic structural parameter set, and the structural reaction power $P^{max}$ from the structural response parameter set, using the following equations:

$$\mu_3 = f\left(S_a(T_{1,i}), P^{max}, \frac{v_u}{w}, T_{1,i}\right);$$

$$\ln\mu_3 = c_0 + c_1\ln\left(\frac{S_a(T_{1,i})}{g\frac{v_u}{w}}\right) + c_2\ln\left(\frac{4\pi^2 P^{max}}{\left(g\frac{v_u}{w}\right)^2 T_{1,i}}\right),$$

where g represents the gravitational constant, $c_0$, $c_1$ and $c_2$ represent predetermined coefficients, and the structural reaction power $P^{max}$ is calculated using the following equations:

$$P^{max} = \max\left\{v_{1F}^r(t)\sum_{i=1}^{N}\frac{w_i}{w}a_i(t)\right\}|_t,$$

where $$v_{1F}^r(t)$$

represents a relative velocity between a floor and a ceiling of a first story of the structure over time (that can be obtained by measuring an absolute acceleration of the floor and an absolute acceleration of the ceiling, and performing a response analysis based on the absolute accelerations), N represents the number of stories of the structure, W represents a total weight of the structure, $W_i$ represents a weight of a ceiling of an $i^{th}$ story of the structure ($W_1+W_2+\ldots+W_N=W$), and $a_i(t)$ represents a measured absolute acceleration of the ceiling of the $i^{th}$ story of the structure. It is noted that in the case that not all of the stories of the structure are equipped with accelerometers for measuring the absolute accelerations of the floors and the absolute accelerations of the ceilings, some of the components in the above equation for calculating the structural reaction power $P^{max}$ would be missing, and the damage estimation module 32 may use estimated numbers based on known knowledge of the structure to fill the missing components.

The fourth ductility component $\mu_4$ is calculated using the maximum structural interstory drift ratio $IDR^{max}$ from the structural response parameter set, and the hypothetical maximum structural interstory drift ratio yield value $$IDR_{yield}^{max}$$

from the basic structural parameter set, using the following equations:

$$\mu_4 = \frac{IDR^{max}}{IDR_{yield}^{max}};$$

$$IDR^{max} = \max\left\{\max\{d_{iF}^r(t)\}|_{t,i=1\sim N}\right\}|_i,$$

where $$d_{iF}^r(t)$$

represents a relative displacement between a floor and a ceiling of an $i^{th}$ story of the structure over time. It is noted that in the case that not all of the stories of the structure are equipped with equipment for measuring the relative displacement of the floor and the ceiling, some of the components in the above equation for calculating the relative displacement $$d_{iF}^r(t)$$

would be missing, and the damage estimation module 32 may use estimated numbers based on known knowledge of the structure to fill the missing components.

The fifth ductility component $\mu_5$ is calculated using the residual structural interstory drift ratio $IDR^{res}$ from the structural response parameter set, and the hypothetical residual structural interstory drift ratio yield value $$IDR_{yield}^{res}$$

from the basic structural parameter set, using the following equations:

$$\mu_5 = \frac{IDR^{res}}{IDR_{yield}^{res}};$$

$$IDR^{res} = \max\{d_{iF}^r(t_{end})\}|_i,$$

where

-continued $$d_{iF}^{r}(t_{end})$$

represents an end value of a relative displacement between a floor and a ceiling of an $i^{th}$ story of the structure after the seismic waves stopped. It is noted that in the case that not all of the stories of the structure are equipped with equipment for measuring the relative displacement of the floor and the ceiling, some of the components in the above equation for calculating the end value $$d_{iF}^{r}(t_{end})$$

would be missing, and the damage estimation module 32 may use estimated numbers based on known knowledge of the structure to fill the missing components.

The sixth ductility component $\mu_6$ is calculated using the initially hypothetical structural fundamental oscillation period $T_{1,i}$ from the basic structural parameter set, using the following equation:

$$\mu_6 = \frac{T_1^2}{T_{1,i}^2},$$

where $$T_1^2$$

represents a structural fundamental oscillation period of the structure that can be obtained by performing a response analysis of the structure.

Figure 3:
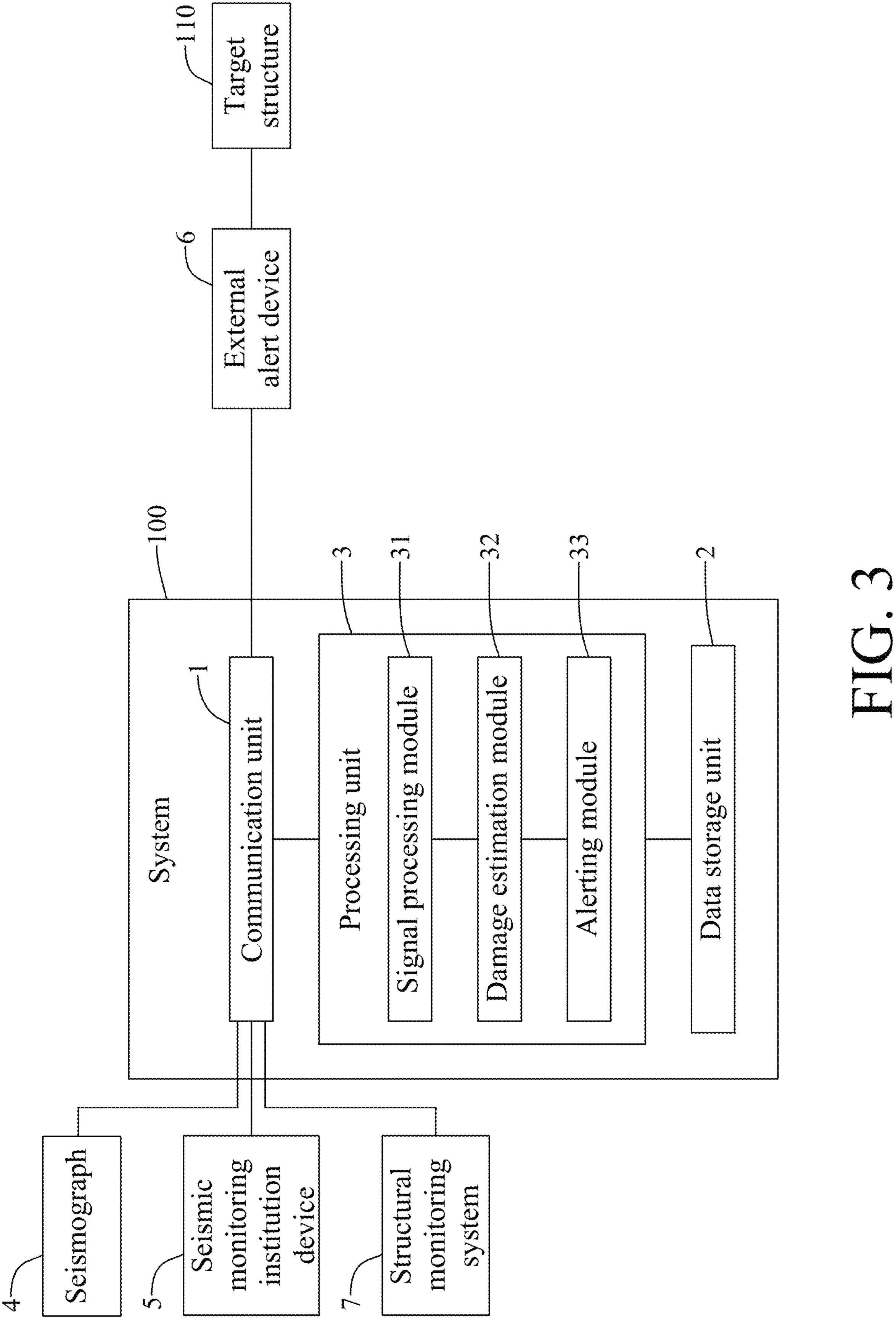
FIG. 3 is a block diagram illustrating another exemplary system for implementing the method of FIG. 1 according to one embodiment of the disclosure.

It is noted that some of the ductility components (specifically, the third ductility component $\mu_3$ to the sixth ductility component $\mu_6$) are calculated using measured data related to the structure that is being affected by the earthquake. FIG. 3 is a block diagram illustrating an exemplary system 100 according to one embodiment of the disclosure. In the embodiment of FIG. 3, the system 100 is further connected to a structural monitoring system 7 that is disposed in the target structure 110 and that is configured to measure data used for calculating the third ductility component $\mu_3$ to the sixth ductility component $\mu_6$ (i.e., the structural response parameter set). It is noted that the operations of the structural monitoring system 7 are readily known in the related art, and details thereof are omitted herein for the sake of brevity.

After the ductility components are calculated, the damage estimation module 32 proceeds to calculate the ductility value μ using one of the above-mentioned equations. It is noted that the calculation of the ductility value μ may be done using other combinations of the ductility components, and is not limited to the above-mentioned equations.

Then, in step S2, the alerting module 33 determines whether the ductility value μ is larger than a predetermined threshold. In the embodiment of FIG. 2, the predetermined threshold may be 1. In the case that the ductility value μ is larger than the predetermined threshold, it may be determined that an alert is needed to be issued for the target structure 110, and the flow proceeds to step S3. Otherwise, in the case that the ductility value μ is not larger than the predetermined threshold, the method is terminated.

In step S3, the alerting module 33 generates and transmits an alert control signal to the external alert device 6, so as to control the external alert device 6 to output an alert for potential structural damage of the target structure 110 based on the alert control signal. As such, people inside the target structure 110 receiving the alert for potential structural damage may be notified to take suitable precautionary actions (e.g., lay down, leave the target structure 110, turn off the heaters, etc.). In embodiments, the external alert device 6 may be configured to output the alert, and/or be connected to other equipment (e.g., building, precision equipment, etc.) that can be controlled to automatically take suitable precautionary actions (e.g., shut down).

In some embodiments, after the ductility value μ is calculated, in step S4, the damage estimation module 32 further estimates a severity of damage on the structure due to the earthquake by comparing the ductility value μ and the allowed ductility capacity (Ra). In the case that the ductility value μ is larger than 1 (meaning that potential damages may be large), different cases associated with the potential damages may be identified based on how large the ductility value μ is. The following Table 1 lists a number of different severities with the corresponding representations.

TABLE 1

| Representation | Structural damage severity | Condition |
|---|---|---|
| Green | No damage detected | $\mu \leq 1$ |
| Yellow | Possibly light to medium damage | $1 < \mu \leq 1 + 0.5(R_a - 1)$ |
| Orange | Possibly medium to severe damage | $1 + 0.5(R_a - 1) < \mu \leq R_a$ |
| Red | Possibly severe damage; may collapse | $\mu > R_a$ |

As such, the alert control signal generated by the alerting module 33 may also include the representation, and in response to receipt of the alert control signal, the external alert device 6 may output a light signal with a color that corresponds with the representation included in the alert control signal.

It is noted that in different embodiments, for different purposes, the alert control signal may be transmitted to the external alert device 6 at one of two different time instances; a first time instance is between the arrival of the P wave and the arrival of the S wave, and a second time instance is after the arrival of the S wave.

Generally, the alert control signal transmitted at the first time instance is generated based on the calculation of the ductility value μ with respect to the P wave, and is for the purpose of notifying the people and/or the equipment to take suitable precautionary actions. On the other hand, the alert control signal transmitted at the second time instance is generated based on the calculation of the ductility value μ with respect to the S wave, and is for the purpose of notifying the people for the estimated potential damage of the target structure 110, and instructing the people to take the appropriate mitigation measures. As such, the unnecessary hazard after the earthquake (e.g., people unknowingly entering a severely damaged building) may be reduced. In some embodiments, two different alert control signals may be generated separately at the two time instances, respectively, and transmitted to the external alert device 6 for different purposes. It is noted that the above calculation of the ductility value μ may also be done with respect to the S wave.

It is noted that in order for the alert control signal to be able to be sent at the first time instance, the calculation of the ductility value μ cannot rely on any one of the third ductility component $\mu_3$ to the sixth ductility component $\mu_6$, since the calculation of the third ductility component $\mu_3$ to the sixth ductility component $\mu_6$ involves using the measured data from the structural monitoring system 7. As such, one exemplary calculation of the ductility value $\mu$ may be done using one of the following equations:

$$\mu = \max(\mu_1, \mu_2\};$$

$$\mu = w_1\mu_1 + w_2\mu_2.$$

In one embodiment, the weight $w_1$ may be 0.7, and the weight $w_2$ may be 0.3.

In various embodiments, the calculation of the ductility value $\mu$ may be done with involvement of different combinations of the six ductility components. In one example, the calculation of the ductility value $\mu$ is done with involvement of the first ductility component $\mu_1$, the second ductility component $\mu_2$, and the third ductility component $\mu_3$. In one example, the calculation of the ductility value $\mu$ is done with involvement of the first ductility component $\mu_1$, the second ductility component $\mu_2$, the third ductility component $\mu_3$, and the fourth ductility component $\mu_4$. In one example, the calculation of the ductility value $\mu$ is done with involvement of the first ductility component $\mu_1$, the second ductility component $\mu_2$, the third ductility component $\mu_3$, the fourth ductility component $\mu_4$, and the fifth ductility component $\mu_5$.

In the above example, the weight $w_1$ may be 0.2, the weight $w_2$ may be 0.1, the weight $w_3$ may be 0.1, the weight $w_4$ may be 0.4, and the weight $w_5$ may be 0.2.

It is noted that other combinations may also be employed, and the calculation of the ductility value $\mu$ is not limited to the above combinations listed.

To sum up, embodiments of the disclosure provide a method and a system for generating alerts for potential structural damage. In the method, the system first calculates an estimated seismic wave parameter set in response to receipt of a P wave from a seismograph. Then, using the estimated seismic wave parameter set and at least one parameter included in a basic structural parameter set associated with a target structure, the system calculates a ductility value. Then, the system compares the ductility value and a predetermined threshold to determine whether an alert for potential structural damage should be generated to the target structure.

In this manner, the method is capable of transmitting an alert control signal to an external alert device at one or both of two different time instances; a first time instance is between the arrival of the P wave and the arrival of the S wave, and a second time instance is after the arrival of the S wave. The alert control signal transmitted at the first time instance is for the purpose of notifying the people and/or the equipment to take suitable precautionary actions. On the other hand, the alert control signal transmitted at the second time instance is for the purpose of notifying the people for the estimated potential damage of the target structure, and instructing the people to take the appropriate mitigation measures.

According to one embodiment of the disclosure, there is a non-transitory computer readable storage medium storing software instructions that, when executed by a processing unit of a system, cause the processing unit to implement the steps of a method for generating an alert for potential structural damage as shown in FIG. 1.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for generating an alert for potential structural damage from an earthquake, implemented using a system that is connected to a seismograph, and an external alert device that is disposed at a target structure, the method comprising:

a) in response to receipt of a first-arrival seismic wave dataset, which is related to a first- arrival seismic wave of the earthquake, from the seismograph, implementing a signal processing procedure to process the first-arrival seismic wave dataset, and to calculate an estimated seismic wave parameter set that includes a spectral acceleration;

b) calculating, based on the estimated seismic wave parameter set and a basic structural parameter set that is associated with the target structure, a ductility value, the basic structural parameter set including a geographical location of the target structure, a structural ultimate base shear coefficient, and an initially hypothetical structural fundamental oscillation period; and c) in a case where the ductility value is larger than a predetermined threshold, generating and transmitting an alert control signal to the external alert device, so as to control the external alert device to output an alert for potential structural damage of the target structure based on the alert control signal, the earthquake including a second-arrival seismic wave that arrives later than the first- arrival seismic wave, wherein step c) is implemented at one or both of a first time instance that is between arrival of the first-arrival seismic wave and arrival of the second-arrival seismic wave, and a second time instance that is after the arrival of the second-arrival seismic wave;

wherein:

in step a), the estimated seismic wave parameter set further includes an instantaneous power; and step b) includes calculating a first ductility component using the spectral acceleration from the estimated seismic wave parameter set, and the structural ultimate base shear coefficient and the initially hypothetical structural fundamental oscillation period from the basic structural parameter set, calculating a second ductility component using the spectral acceleration and the instantaneous power from the estimated seismic wave parameter set, and the structural ultimate base shear coefficient and the initially hypothetical structural fundamental oscillation period from the basic structural parameter set, and using a weighted average of the first ductility component and the second ductility component or a largest one of the first ductility component and the second ductility component as the ductility value.

2. A non-transitory computer storage medium storing computer instructions that, when executed by a processing unit of a computer device, cause the processing unit to execute the steps of the method as claimed in claim 1.

3. A method for generating an alert for potential structural damage from an earthquake, implemented using a system that is connected to a seismograph, and an external alert device that is disposed at a target structure, the method comprising:

a) in response to receipt of a first-arrival seismic wave dataset, which is related to a first- arrival seismic wave of the earthquake, from the seismograph, implementing a signal processing procedure to process the first-arrival seismic wave dataset, and to calculate an estimated seismic wave parameter set that includes a spectral acceleration;

b) calculating, based on the estimated seismic wave parameter set and a basic structural parameter set that is associated with the target structure, a ductility value, the basic structural parameter set including a geographical location of the target structure, a structural ultimate base shear coefficient, and an initially hypothetical structural fundamental oscillation period; and c) in a case where the ductility value is larger than a predetermined threshold, generating and transmitting an alert control signal to the external alert device, so as to control the external alert device to output an alert for potential structural damage of the target structure based on the alert control signal;

the earthquake including a second-arrival seismic wave that arrives later than the first-arrival seismic wave, the system being further connected to a structural monitoring system that is disposed in the target structure and that is configured to measure a structural response parameter set that includes a structural reaction power, wherein:

in step a), the estimated seismic wave parameter set further includes an instantaneous power; and step b) includes calculating a plurality of ductility components, and using a weighted average of the plurality of ductility components or a largest one of the plurality of ductility components as the ductility value;

the plurality of ductility components include a first ductility component calculated using the spectral acceleration, the structural ultimate base shear coefficient and the initially hypothetical structural fundamental oscillation period, a second ductility component calculated using the spectral acceleration, the instantaneous power, the structural ultimate base shear coefficient and the initially hypothetical structural fundamental oscillation period, and a third ductility component calculated using the spectral acceleration, the structural ultimate base shear coefficient, the structural reaction power, and the initially hypothetical structural fundamental oscillation period; and step c) is implemented after arrival of the second-arrival seismic wave.

4. The method as claimed in claim 3, the structural response parameter set further including a maximum structural interstory drift ratio, the basic structural parameter set further including a hypothetical maximum structural interstory drift ratio yield value, wherein the plurality of ductility components further include a fourth ductility component calculated using the maximum structural interstory drift ratio, and the hypothetical maximum structural interstory drift ratio yield value.

5. The method as claimed in claim 4, the structural response parameter set further including a residual structural interstory drift ratio, the basic structural parameter set further including a hypothetical residual structural interstory drift ratio yield value, wherein the plurality of ductility components further include a fifth ductility component calculated using the residual structural interstory drift ratio and the hypothetical residual structural interstory drift ratio yield value.

6. The method as claimed in claim 5, wherein the plurality of ductility components further include a sixth ductility component calculated using the initially hypothetical structural fundamental oscillation period and a structural fundamental oscillation period of the target structure.

7. A system for generating an alert for potential structural damage from an earthquake, the system being connected to a seismograph, and an external alert device that is disposed at a target structure, the system comprising:

a communication unit that communicates with the external alert device and that receives a first-arrival seismic wave dataset, which is related to a first-arrival seismic wave of the earthquake, from the seismograph;

a data storage unit that stores a basic structural parameter set that is associated with the target structure, the basic structural parameter set including a geographical location of the target structure, a structural ultimate base shear coefficient, and an initially hypothetical structural fundamental oscillation period; and a processing unit that is connected to the communication unit and the data storage unit, and that is programmed to implement a signal processing procedure to process the first-arrival seismic wave dataset, calculate an estimated seismic wave parameter set including a spectral acceleration, calculate, based on the estimated seismic wave parameter set and the basic structural parameter set, a ductility value, and in a case where the ductility value is larger than a predetermined threshold, generate and transmit an alert control signal to the external alert device, so as to control the external alert device to output an alert for potential structural damage of the target structure based on the alert control signal;

the earthquake including a second-arrival seismic wave that arrives later than the first- arrival seismic wave, wherein the processing unit is programmed to transmit the alert control signal at one or both of a first time instance that is between arrival of the first-arrival seismic wave and arrival of the second-arrival seismic wave, and a second time instance that is after the arrival of the second-arrival seismic wave;

wherein:

the processing unit calculates the estimated seismic wave parameter set to further include an instantaneous power; and the processing unit calculates the ductility value by calculating a first ductility component using the spectral acceleration from the estimated seismic wave parameter set, and the structural ultimate base shear coefficient and the initially hypothetical structural fundamental oscillation period from the basic structural parameter set, calculating a second ductility component using the spectral acceleration and the instantaneous power from the estimated seismic wave parameter set, and the structural ultimate base shear coefficient and the initially hypothetical structural fundamental oscillation period from the basic structural parameter set, and using a weighted average of the first ductility component and the second ductility component or a largest one of the first ductility component and the second ductility component as the ductility value.

8. A system for generating an alert for potential structural damage from an earthquake, the system being connected to a seismograph, and an external alert device that is disposed at a target structure, the system comprising:

a communication unit that communicates with the external alert device and that receives a first-arrival seismic wave dataset, which is related to a first-arrival seismic wave of the earthquake, from the seismograph;

a data storage unit that stores a basic structural parameter set that is associated with the target structure, the basic structural parameter set including a geographical location of the target structure, a structural ultimate base shear coefficient, and an initially hypothetical structural fundamental oscillation period; and a processing unit that is connected to the communication unit and the data storage unit, and that is programmed to implement a signal processing procedure to process the first-arrival seismic wave dataset, calculate an estimated seismic wave parameter set including a spectral acceleration, calculate, based on the estimated seismic wave parameter set and the basic structural parameter set, a ductility value, and in a case where the ductility value is larger than a predetermined threshold, generate and transmit an alert control signal to the external alert device, so as to control the external alert device to output an alert for potential structural damage of the target structure based on the alert control signal;

the earthquake including a second-arrival seismic wave that arrives later than the first-arrival seismic wave, the system being further connected to a structural monitoring system that is disposed in the target structure and that is configured to measure a structural response parameter set that includes a structural reaction power, wherein:

the processing unit calculates the estimated seismic wave parameter set to further include an instantaneous power; and the processing unit calculates the ductility value by calculating a plurality of ductility components, and using a weighted average of the plurality of ductility components or a largest one of the plurality of ductility components as the ductility value;

the plurality of ductility components include a first ductility component calculated using the spectral acceleration, the structural ultimate base shear coefficient and the initially hypothetical structural fundamental oscillation period, a second ductility component calculated using the spectral acceleration, the instantaneous power, the structural ultimate base shear coefficient and the initially hypothetical structural fundamental oscillation period, and a third ductility component calculated using the spectral acceleration, the structural ultimate base shear coefficient, the structural reaction power, and the initially hypothetical structural fundamental oscillation period; and the processing unit is programmed to transmit the alert control signal after arrival of the second-arrival seismic wave.

9. The system as claimed in claim 8, the structural response parameter set further including a maximum structural interstory drift ratio, wherein:

the basic structural parameter set stored in the data storage unit further includes a hypothetical maximum structural interstory drift ratio yield value; and the plurality of ductility components further include a fourth ductility component calculated using the maximum structural interstory drift ratio, and the hypothetical maximum structural interstory drift ratio yield value.

10. The system as claimed in claim 9, the structural response parameter set further including a residual structural interstory drift ratio, wherein:

the basic structural parameter set stored in the data storage unit further includes a hypothetical residual structural interstory drift ratio yield value; and the plurality of ductility components further includes a fifth ductility component calculated using the residual structural interstory drift ratio and the hypothetical residual structural interstory drift ratio yield value.

11. The system as claimed in claim 10, wherein the plurality of ductility components further include a sixth ductility component calculated using the initially hypothetical structural fundamental oscillation period and a structural fundamental oscillation period of the target structure.

* * * * *